United States Patent [19]
Zagnoev

[11] Patent Number: 5,936,555
[45] Date of Patent: Aug. 10, 1999

[54] COMBINED KEYBOARD AND MOUSE EMPLOYING CONVENTIONAL TYPING KEYS

[76] Inventor: Ari Zagnoev, 219 Australia St., Newtown NSW 2042, Australia

[21] Appl. No.: 09/012,839

[22] Filed: Jan. 23, 1998

[30] Foreign Application Priority Data

Jan. 28, 1997 [ZA] South Africa .......................... 97/0682

[51] Int. Cl.$^6$ .............................................. H03M 11/00
[52] U.S. Cl. .......................... 341/22; 400/489; 345/163; 345/168
[58] Field of Search .................................. 341/20, 21, 22; 345/163, 168, 167, 165, 160; 400/489

[56] References Cited

U.S. PATENT DOCUMENTS

| | | | |
|---|---|---|---|
| 2,040,248 | 5/1936 | Dvorak et al. | |
| 4,917,516 | 4/1990 | Retter | 400/489 |
| 5,049,863 | 9/1991 | Oka | 345/163 |
| 5,063,376 | 11/1991 | Chang | 345/163 |
| 5,426,449 | 6/1995 | Danziger | 341/22 |
| 5,457,480 | 10/1995 | White | 345/168 |
| 5,621,436 | 4/1997 | Solhjell | 345/163 |

*Primary Examiner*—Michael Horabik
*Assistant Examiner*—Albert K. Wong
*Attorney, Agent, or Firm*—Welsh & Katz, Ltd.

[57] ABSTRACT

A combined keyboard and pointing system for use with a computer is disclosed. The system comprises a keyboard consisting of at least two keyboard parts for generating keying commands wherein substantially all keys of a standard QWERTY or DVORAK keyboard are located on the keyboard, equally distributed with about half the keys being on a first keyboard part and the other half of the keys on a second keyboard part. At least one of the first and second keyboard parts are adapted to be gripped by one hand of a user and be moved on support surface as a mobile keyboard part to generate pointing movement commands to cause movement of a pointing member on the computer. A transducer is used to detect relative movement or positioning of the mobile keyboard part relative to the support surface and a communication mens is provided for the first and second keyboard parts to send the pointing movement commands and the keying commands to the computer.

6 Claims, 5 Drawing Sheets

COMBINED KEYBOARD AND MOUSE EMPLOYING CONVENTIONAL TYPING KEYS

FIELD OF INVENTION

The present invention relates to keyboards for electronic equipment (e.g. computers).

BACKGROUND TO INVENTION

Pointing arrangements for desk top computers and other electronic equipment generally make use of the conventional mouse device. The mouse device includes a moveable unit typically joined by way of a cable to the electronic equipment (e.g. computer), the moveable unit being adapted to be moved on a surface, e.g. a desk. Invariably the mouse unit uses up valuable desk space. In addition it is inconvenient to move one's hand to and from the keyboard and the mouse unit.

Current pointing arrangements, that are integrated with keyboards, such as track balls, touchpads and pointing sticks, do not match the dexterity of the conventional mouse and are often not used but are substituted for by a conventional mouse unit coupled to the computer, again resulting in the additional desk space required.

To overcome the problem of moving ones hand to and from the keyboard and mouse (and to overcome other problems such as repetitive stress injury) a combination keyboard and mouse device has been conceived by Retter, U.S. Pat. No. 4,917,516. The invention provides for a data entry method in which the keyboard and mouse are combined. Two similar units are proposed to be used by the left and right hands of the user. The type of key entry specified consists of receiving wells for receiving the thumbs and fingers of hands. Within these wells alphanumeric data entry keys are clustered so that each finger and thumb is capable of operating a number of different keys from a single "home" position by using small horizontal and downward movements of the fingers. This method as such does not use conventional typing keys and the user is required to learn a new typing method different from the standard and typically flat keyboard known as the "QWERTY" keyboard. The requirement of having to learn a new typing method has prevented the wide spread acceptance of the aforementioned invention. It is the main object of the proposed invention to overcome this obstacle by providing for an the essentially standard, flat "OWERTY" keyboard to be used with the combination keyboard and mouse system. Other keyboard layouts that rearrange the key positions in more logical arrangements could be used such as the "Dvorak" keyboard (U.S. Pat. No. 2,040,248). However, although the "Dvorak" keyboard is also flat it requires a new typing method to be learnt and as such is unlikely to be used.

As used above and throughout the specification the term conventional data input keys is to be understood to mean keys which have lie in a grid array under each user's hand and which are arranged to lie in a planar or a substantially planar surface. Such an arrangement includes QWERTY keyboards and Dvorak keyboards.

The term QWERTY keyboard, is to be understood to mean a keyboard which utilises conventional data input keys in which the top line of alphabetic keys are arranged left to right as q, w, e, r, t, y.

It is an object of this invention to provide a combined keyboard pointing arrangement that can be used on either or both notebook or desktop computers, or other electronic equipment and which utilises a conventional keyboard layout, so avoiding the need to retrain keyboard users.

SUMMARY OF INVENTION

According to the invention, there is provided a combined keyboard pointing arrangement which includes at least one moveable keyboard part moveably arranged on a support surface; and a communication means for at least one of the moveable keyboard parts for operative communication with a computer or other electronic equipment to cause movement of a pointing member.

The keyboard part or one of the keyboard parts may include only part of the conventional keys on a keyboard.

The keyboard part or one of the keyboard parts may include all conventional keys on a keyboard.

At least one moveable keyboard part may include at least some alphabetic keys.

Two moveable keyboard parts may be provided, one preferably being adapted to be operated by the left hand of a user and the other preferably being operable by the right hand of a user.

The support surface may be a specially designed base. Alternatively the support surface may be an existing work surface, such as a table or desk top, which may be fitted with a suitable mat such as a mouse pad.

The arrangement may include a transducer(s) to detect relative movement or positioning of the moveable keyboard part or one of the keyboard parts relative to the support surface.

The transducer(s) may include any suitable monitoring means to monitor relative movement or position such as a rolling ball, radio frequency locating, optical locating, electrostatic sensing or pressure sensitive pad.

The moveable keyboard part(s) may be moveably supported by any suitable means, such as sliders or rollers.

The moveable keyboard part(s) may have locating recesses or ridges or surfaces for cooperation with particular fingers or palm of a user, e.g. thumb, ring finger, small finger, etc.

The moveable keyboard part(s) may have gripping or resting surface to enable any finger(s) and or palm(s) of the user's hand(s) to establish a grip on the moveable keyboard part(s) in order to move the moveable keyboard part(s) as required.

The locating recesses or ridges and/or the gripping or resting surfaces may be associated with sensors adapted to cause operation of a pointing member.

During non-operation of the pointing member, the sliders or rollers may be lockable so as to prevent movement of the associated keyboard part. Such locking may be by way of a frictional lock.

If the surf is a specially designed base, then the arrangement may include a restraining mechanism(s) to render the moveable keyboard part(s) captive to the base of the keyboard.

The communication means may include a wireless communications system, e.g. infra-red, radio frequency or optical system.

BRIEF DESCRIPTION OF DRAWINGS

The invention will now be described by way of example with reference to the accompanying schematic drawings.

In the drawings there is shown.

DETAILED DESCRIPTION OF DRAWINGS

Figure 1:
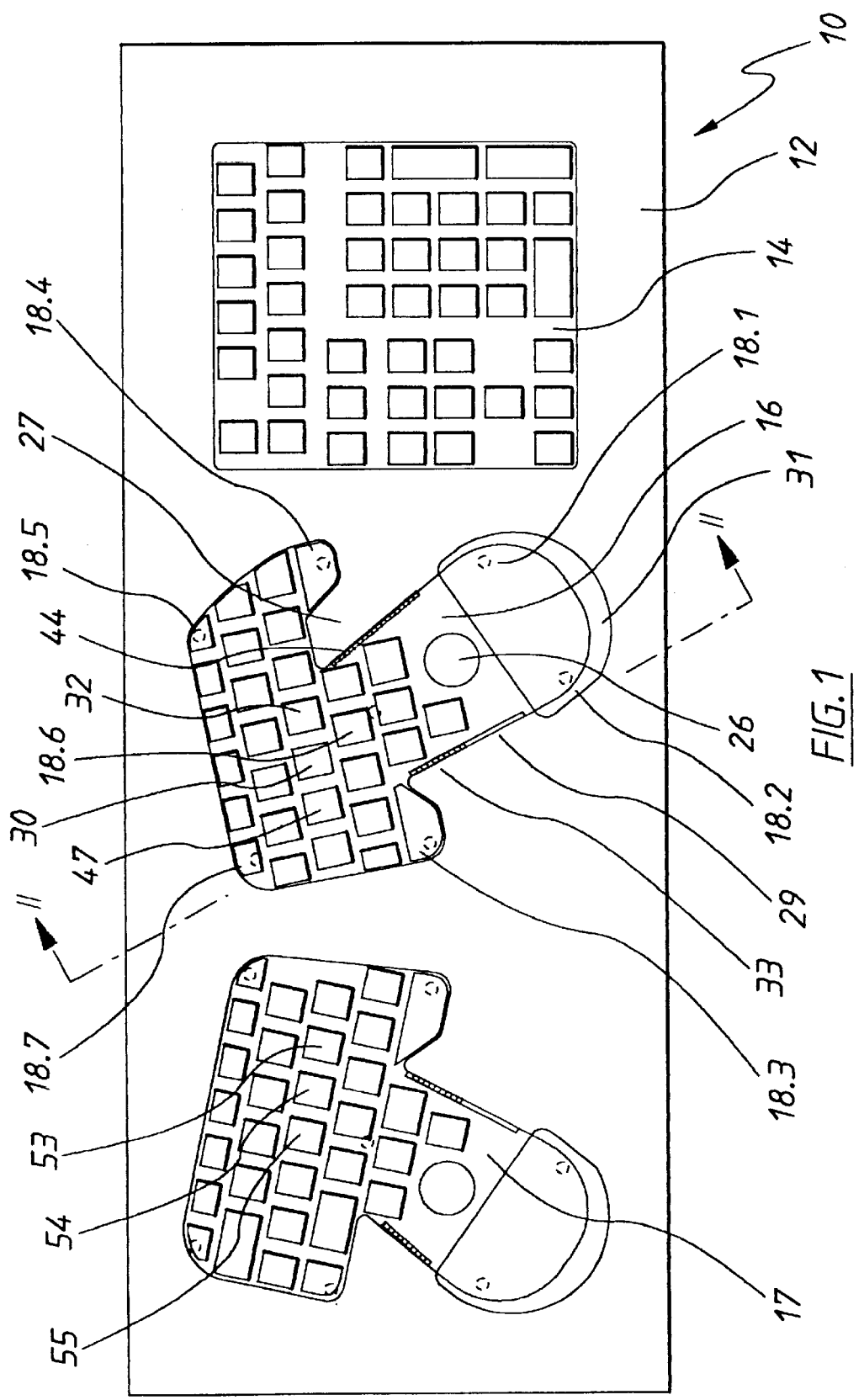
FIG. 1 a plan view of a first embodiment of an integrated keyboard pointing arrangement in accordance with the invention.
Figure 2:
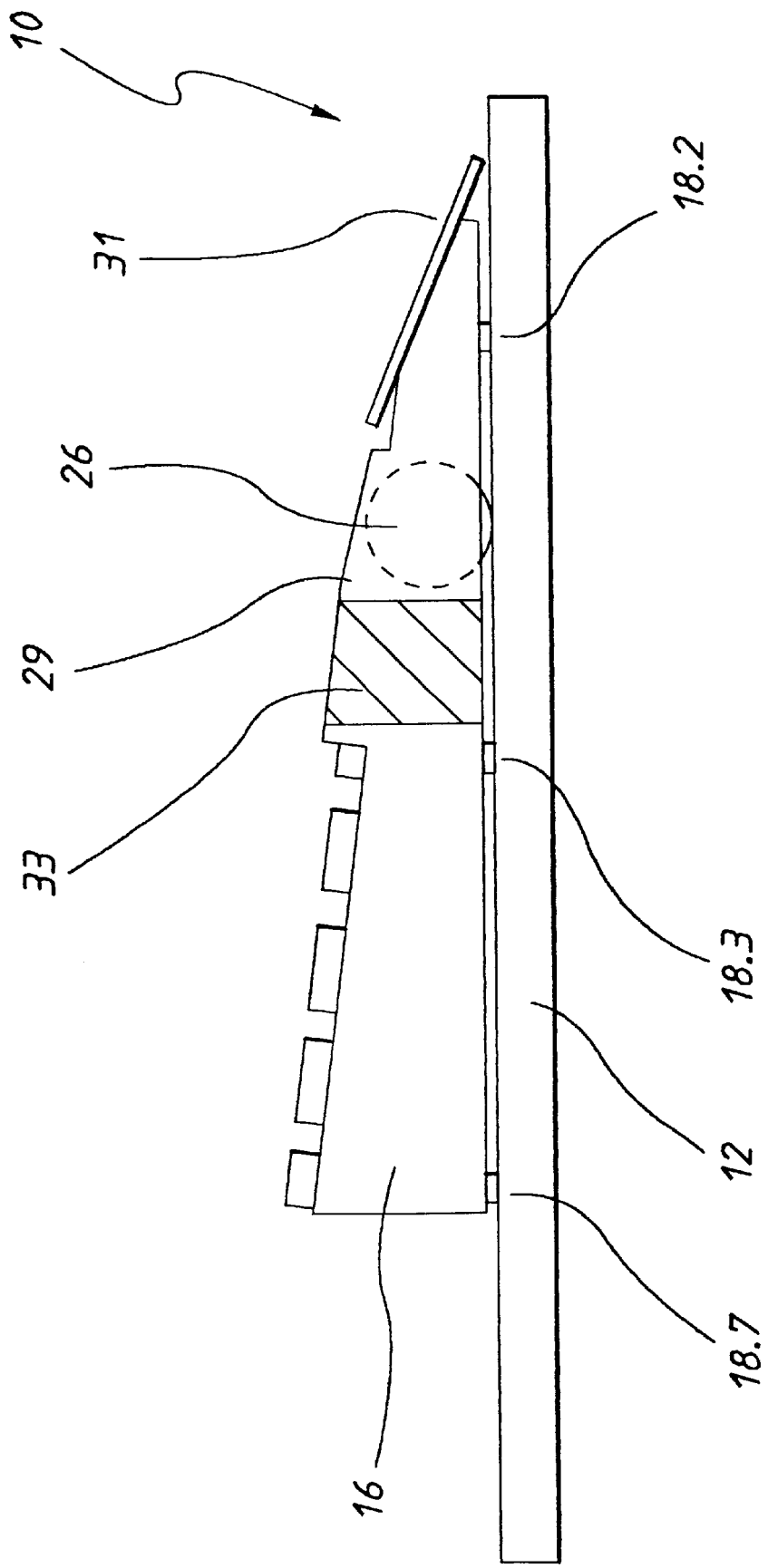
FIG. 2 a sectional end view seen along arrows ||—|| in FIG. 1 (for clarity some details are not shown)

Referring to FIGS. 1 and 2, an integrated keyboard pointing arrangement 10 according to the invention is shown. The arrangement 10 includes a stationary keyboard part 14 and two mobile keyboard parts 16 and 17 mounted on a support surface 12 (the support surface may be a table or a suitable pad such as a mouse pad). Each of the three parts i.e. the stationary part 14 and the two mobile parts 16 and 17 are coupled to a CPU in a conventional manner (details of these components not being shown). This may be via a cable or may be by way of wireless communication. The mobile part 16 is adapted to be operated by the right hand and the other mobile part 17 to be operated by the left hand of a user. The description below will describe operation with the right hand but it must be understood that operation by way of the left hand is similar.

The mobile part 16 is free to move relative to the support surface 12. The mobile part 16 is moveably supported by way of low friction sliders or rollers 18.1, 18.2, 18.3, 18.4, 18.5, 18.6 and 18.7 that enable required movement on the support surface. The mobile part 16 includes suitable surfaces to allow the hand to grip the mobile part as follows: a gripping surface 29 for the thumb is provided, while a gripping surface 44 is included for either or both, the small and ring fingers. The thumb gripping surface 29 is a raised section that protrudes above the level of the keys enabling the thumb to easily slide across and locate the gripping surface 29. The mobile part 16 also includes a palm rest 31. The palm rest 31 may be adjustable to suit the size and shape of the hand of the user. The part 29 may be fitted with a sensing device 33, which may be a transducer or a button. Alternatively the sensing device may be located on the small/ring finger grip 44. The description below assumes that the sensing device is on the part 29.

The mobile part 16 has a cut-out 27 to allow either or both the small and the ring fingers to be in contact with the support surface 12 while it/they are gripping the mobile part 16. Alternatively the small finger may rest on the support surface 12 without touching the mobile part 16.

The sliders or rollers may be arrested or the mobile part 16 may be restrained by introducing sufficient friction between the mobile keyboard part 16 and the support surface 12.

A transducer 26 is located below the mobile part 16 to detect the relevant movement of the mobile part 16 relative to the support surface 12.

The arrangement 10 operates in two modes of operation:

The first mode is the standard mode of operation, being the so-called "keyboard mode". In this mode the arrangement 10 acts as a keyboard in the conventional manner. During pauses while typing the palm can rest on the part 31.

In this mode, even if movement of parts 16 and 17 occurs, the transducer 26 may be deactivated and no movement of the cursor occurs. This deactivation may be by hardware or software control.

The second mode of operation is the so-called "mouse mode" or pointing mode. The hand of the user moves from the neutral typing position to the mouse mode position by moving one key length to the right and then dropping onto the palm rest 31. Thus minimal movement of the hand occurs in changing from the keyboard mode to the mouse mode and vice versa. Placing the thumb against the part 33 activates this mode. The sensing arrangement 33 senses the presence of the thumb and activates the "mouse mode". The ring finger can grip the part 44, the small finger can rest on the support surface 12 and the palm can rest on the part 31 and may also rest partially on the support surface 12. A firm grip of the mobile part 16 by the operator is thus established. The position of the operators hand thus aligns the pointing finger on the "K" key 30 and the middle finger on the "L" key 32. These keys act as the conventional left and right mouse click buttons when the part 16 is in the mouse mode. The transducer 26 determines the movement of the mobile mouse pointer part 16 relative to the support surface 12. This movement causes the mouse cursor to move on the screen of the computer to which the arrangement is communicating.

Alternatively, the hand of the user may remain in the neutral typing position with placement of the thumb against the part 33 activating the mouse mode of operation. The sensing arrangement senses the presence of the thumb and activates the "mouse mode". The small finger can grip the part 44 while the palm can rest on the palm rest 31 and may also rest partially on the support surface 12. A firm grip of the mobile part 16 by the user is thus established. The position of the operators hand thus aligns the pointing finger on the "J" key 47, the middle finger on the "K" key 30 and the ring finger on the "L" key 32 with the "J" and "L" keys being the conventional left and right mouse click buttons. In this configuration no sideways movement of the users hand is required to move between the typing position and the mouse position or vice versa. In this configuration transition between the keyboard mode and mouse mode is achieved by merely clenching or unclenching the hand in a natural manner. This action is instinctive and almost instantaneous.

When the thumb is removed from the sensing device 33, the keyboard mode is reactivated. In this mode the movement of the mobile part 16 may be limited, e.g. by causing the sliders or rollers 18.1, 18.2, 18.3, 18.4, 18.5, 18.6, 18.7 to be locked, or by the keyboard being blocked or restricted.

Figure 3:
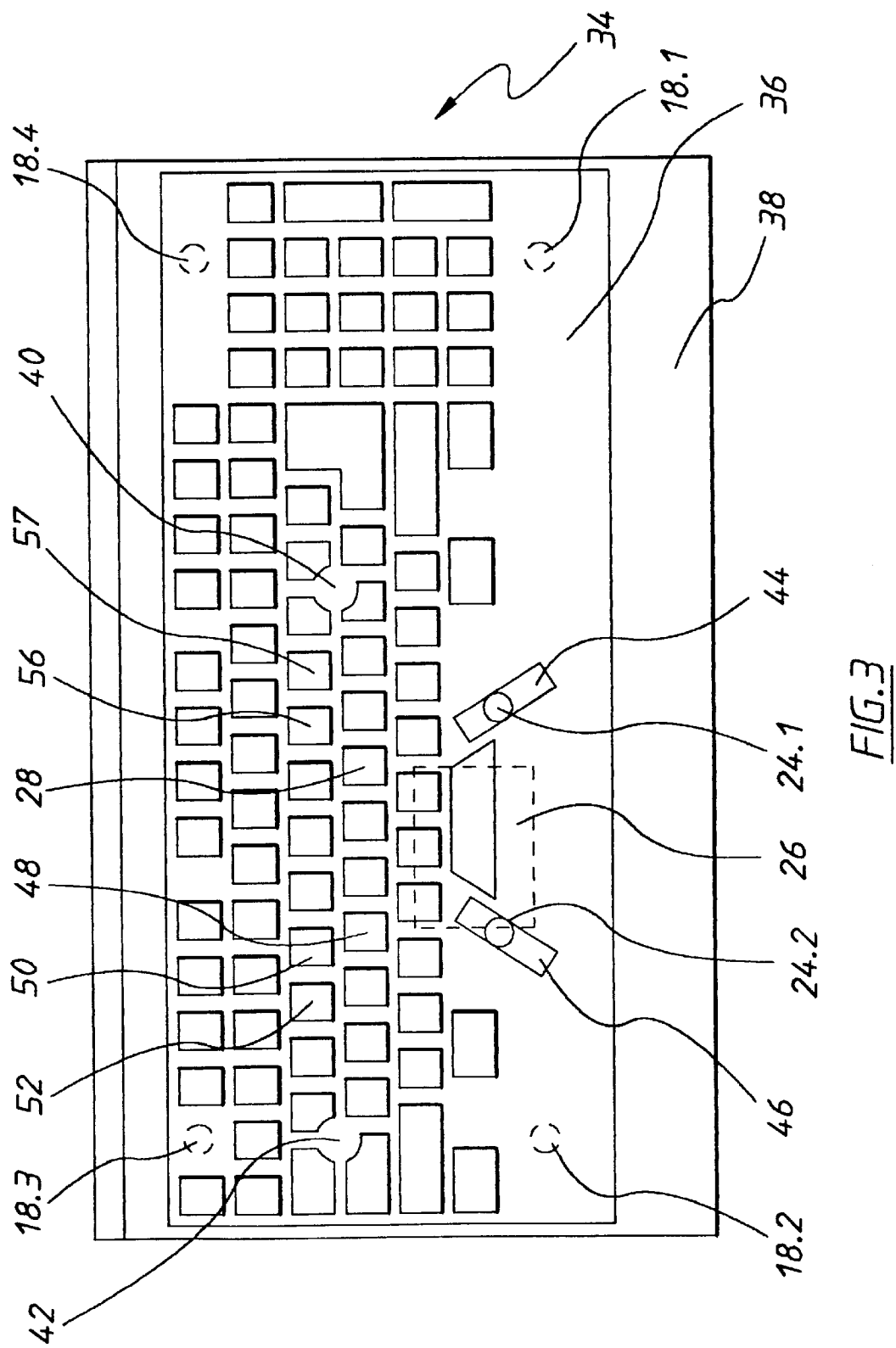
FIG. 3 a plan view of a second embodiment of an integrated keyboard pointing arrangement in accordance with the invention.
Figure 4:
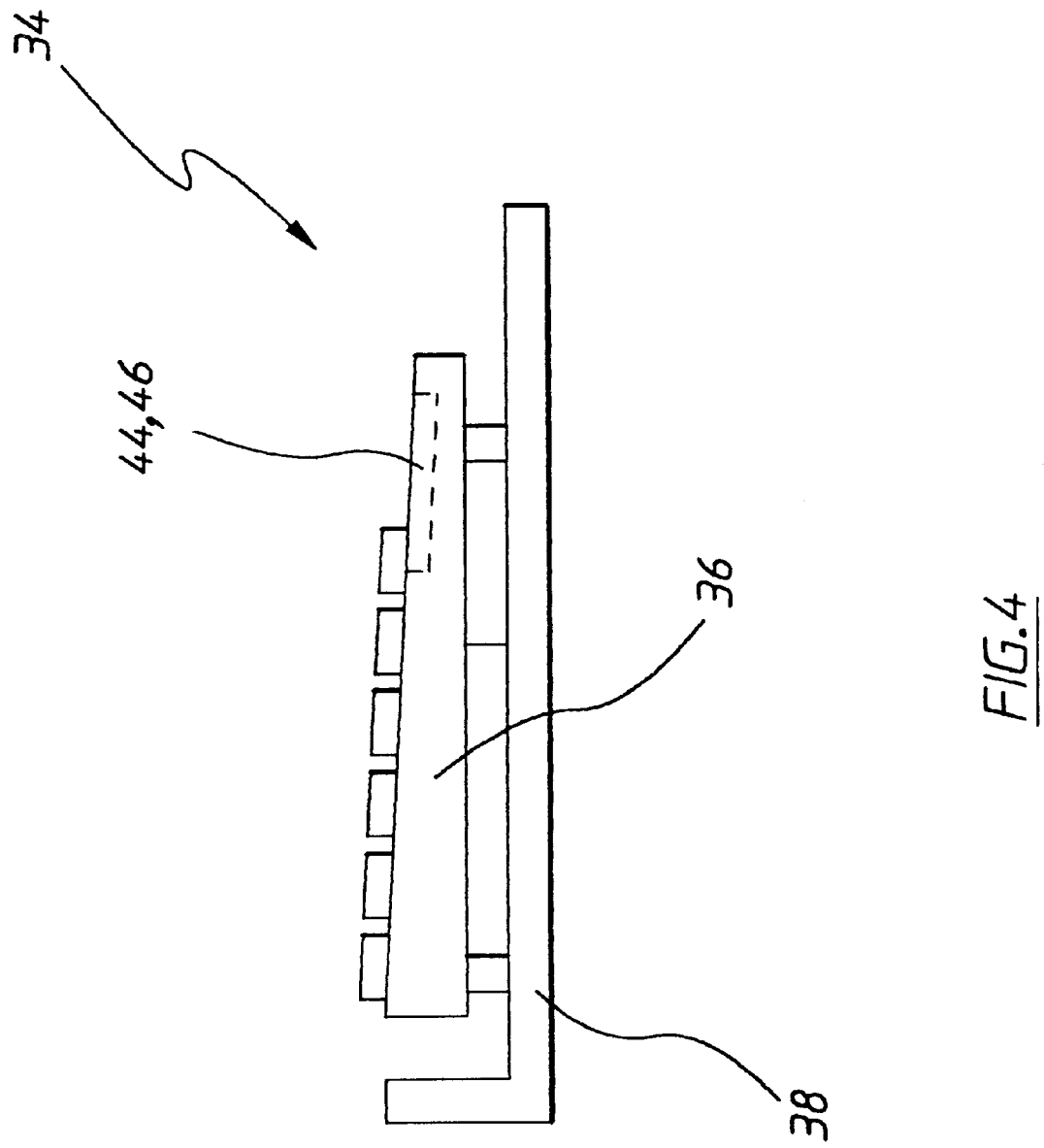
FIG. 4 a side view seen along arrow V in FIG. 3.
Figure 5:
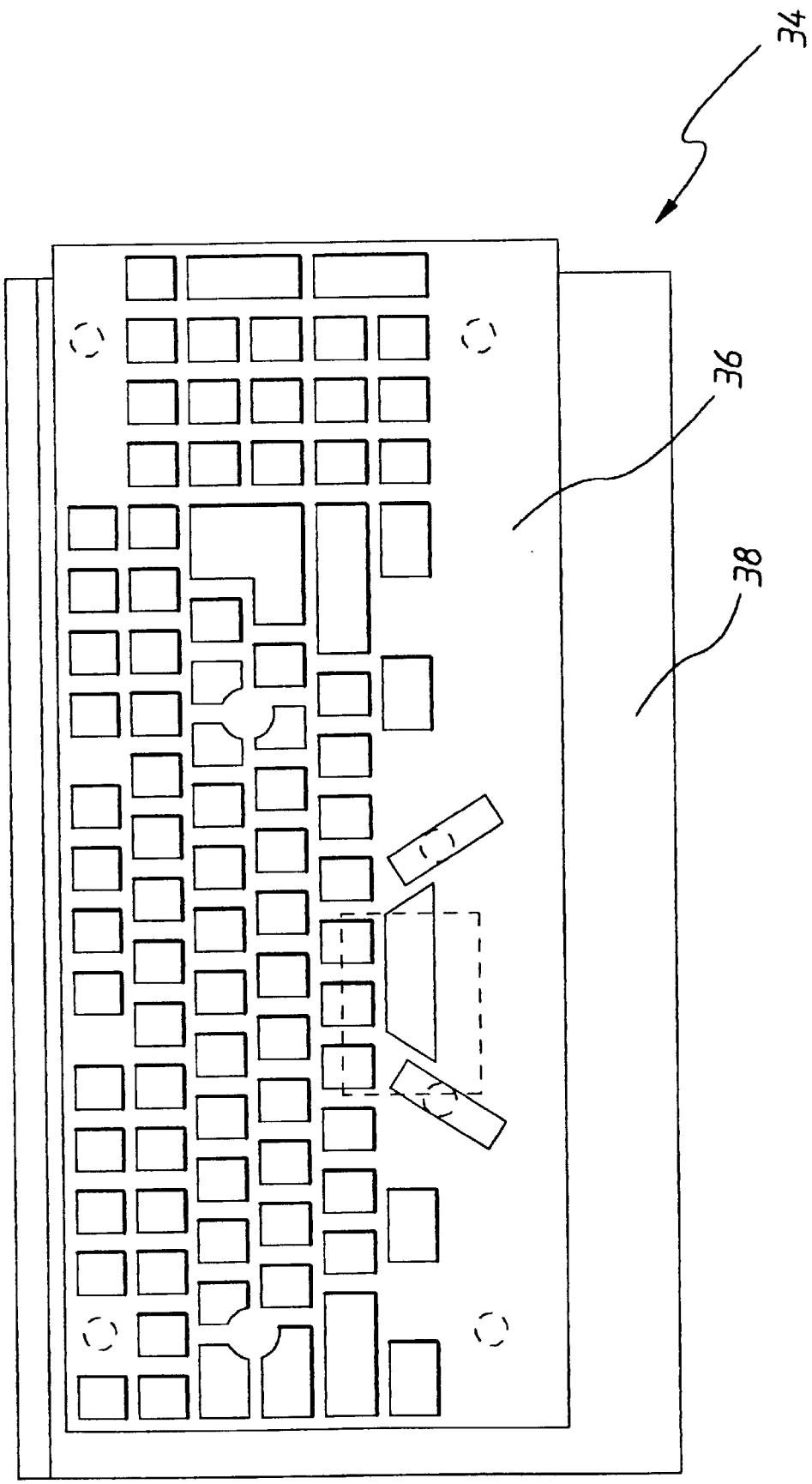
FIG. 5 a plan view similar to FIG. 3 but after the integrated keyboard pointing arrangement has been moved from its neutral position.

In FIGS. 3,4 and 5 a second embodiment of an integrated keyboard pointing arrangement 34 according to the invention is shown. The same parts as in FIGS. 1 to 2 will be referred to by the same reference numerals.

In this case a single mobile part 36 is provided (which may include all or most of the keys of the keyboard) and is moveably supported on a base 38. The mobile part 36 includes two recesses 40, 42 and two engagement parts 44, 46. The parts 44 and 46 may be recesses or raised sections, and one or both of these parts may be fitted with sensing arrangement(s) 24.1 (and 24.2). (Alternatively the sensing arrangements(s) may also be conveniently located in the recesses 40 and 42, to be activated by the small finger(s) of a user.)

The arrangement 34 also operates in two modes of operation.

The first mode is the standard mode of operation, being the so-called "keyboard mode". In this mode the arrangement 34 acts as a keyboard in the conventional manner.

The second mode of operation is the so-called "mouse mode" or pointing mode. This mode is activated by placing a thumb of either one or both hands in or against the parts 44 or 46 (or either one or both small fingers in the recesses 40 and 42, as the case may be). The sensing arrangement 24.1 or 242 then senses the presence of the thumb(s) (or small fingers as the case may be) and activates the "mouse mode". The tip of the small finger of either one or both hands is placed in the recess 40 or 42 ensuring a firm hold on the mobile part 36. The position of the operators right hand thus aligns the pointing finger on e.g. the "J" key 28, the middle finger on the "I" key 56 and the ring finger on the "O" key 57. The position of the operator's left hand will align the pointing finger on, e.g., the "F" key 48, the middle finger on the "R" key 50 and the ring finger on the "E" key 52. These keys act as the conventional mouse dick buttons when the arrangement 34 is in the mouse mode. The movement of the mobile part 36 relative to the base 38 is determined by the transducer 26. This movement causes the cursor to move on the screen of the computer to which the arrangement communicates.

When the thumb or thumbs (or small finger(s) as the case may be) are removed from the sensing device(s) 24.1 or 24.2, the keyboard mode is reactivated.

FIGS. 3 and 5 indicate the mobile unit 36 in two different positions relative to the base 38.

I claim:

1. A combined keyboard and pointing system for use with a computer, said system comprising a keyboard consisting of at least two keyboard parts having keys for generating keying commands wherein substantially all keys of a standard QWERTY or DVORAK keyboard are located on said keyboard, with about half the keys being on a first keyboard part and the other half of the keys on a second keyboard part, the first keyboard part being adapted to be gripped by one had of the user and be moved on a support surface as a mobile keyboard part to generate pointing movement commands to cause movement of a pointing member on said computer associated therewith, at least one transducer to detect relative movement or positioning of the mobile keyboard part relative to the support surface, and a communication means for said first and second keyboard parts to send said pointing movement commands and said keying commands to said computer.

2. The system of claim 1, wherein the second keyboard part is adapted to be gripped by a hand of the user as a mobile keyboard part, said first keyboard part being adapted to be operated by the right hand of the user and said second keyboard part being operable by the left hand of the user.

3. The system of claim 1, wherein the mobile keyboard part further includes gripping surfaces for cooperation with the user's thumb and small finger and a resting surface for cooperation with the user's palm.

4. The system of claim 3, wherein the mobile keyboard part further includes a sensor device arranged on one of the gripping surfaces provided for cooperation with the user's thumb and small or ring finger to switch between a pointing mode where the pointing movement commands are sent to said computer and a keying mode where the keying commands are sent to said computer.

5. The system of claim 4, wherein the sensor device is adapted to be activated with said pointing movement mode being activated when said sensor device is activated.

6. The system of claim 4, wherein when the mobile keyboard part is in the pointing movement mode, the J, K and L keys of QWERTY keyboard are adapted to be used as switches for pointing click commands.

* * * * *